United States Patent
Molisch et al.

(10) Patent No.: US 7,324,604 B2
(45) Date of Patent: Jan. 29, 2008

(54) SYSTEM AND METHOD FOR SHAPING ULTRA WIDE BANDWIDTH SIGNAL SPECTRUM

(75) Inventors: Andreas Molisch, Arlington, MA (US); Yunnan Wu, Princeton, NJ (US); Sun Y. Kung, Princeton, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 792 days.

(21) Appl. No.: 10/602,743

(22) Filed: Jun. 24, 2003

(65) Prior Publication Data
US 2007/0286260 A1  Dec. 13, 2007

Related U.S. Application Data

(60) Provisional application No. 60/451,577, filed on Mar. 3, 2003.

(51) Int. Cl.
*H04K 1/02* (2006.01)
(52) U.S. Cl. ..................... 375/296; 370/319
(58) Field of Classification Search ............... 375/130, 375/132, 133, 135, 138, 140, 141, 146, 256, 375/259, 285, 295, 296, 239, 240; 370/319–321, 370/330, 335, 340–344, 441, 442, 464, 465, 370/478–481
See application file for complete search history.

(56) References Cited

U.S. PATENT DOCUMENTS 5,742,814 A * 4/1998 Balasa et al. ............... 707/102
2002/0034191 A1* 3/2002 Shattil ....................... 370/464

OTHER PUBLICATIONS

Adams (Quadratic Programming Approaches to New Problems in Digital filter design Conference Record. Twenty Fourth Asilomar Conference on Signals, Systems and Computers Maple Press, San Jose, CA, USA, 1, 307-310, 1990).*
Sartori et al ( Neural Network Training Via Quadratic Optimization, ircuit and Systems, 1992 ISCAS '92 Proceedins , 1992 International Symposium).*

* cited by examiner

*Primary Examiner*—Chieh M. Fan
*Assistant Examiner*—Jaison Joseph
(74) *Attorney, Agent, or Firm*—Dirk Brinkman; Clifton D. Mueller; Gene V. Vinokur

(57) ABSTRACT

A method and system shapes a spectrum of an impulse radio signal, such as an UWB signal. First, basis pulses at various frequencies and pseudo-random delays are generated. The generated set of basis pulses are then weighted and delayed, and combined linearly to conform the spectrum of the transmitted basis pulses to a spectral mask. The spectral mask can be predetermined, or the conforming can be adaptive. Furthermore, the basis pulses can be frequency-shifted before the combining.

19 Claims, 5 Drawing Sheets

US 7,324,604 B2

SYSTEM AND METHOD FOR SHAPING ULTRA WIDE BANDWIDTH SIGNAL SPECTRUM

CROSS REFERENCE TO RELATED APPLICATION

A claim of priority is made to U.S. provisional application Ser. No. 60/451,577, "UWB Communication system with shaped signal spectrum by pulse combination," filed Mar. 3, 2003.

FIELD OF THE INVENTION

This invention relates generally to wireless communications, and more particularly to shaping the spectrum of transmitted signals in ultra wide bandwidth communication systems.

BACKGROUND OF THE INVENTION

With the release of the "First Report and Order," Feb. 14, 2002, by the Federal Communications Commission (FCC), interest in ultra wide bandwidth (UWB) communication systems has increased. The IEEE 802.15 standards organization, which is responsible for personal area networks (PAN), has established a task group, TG3a, to standardize a high-data-rate physical layer based on UWB. One of the most important requirements is compliance with the FCC spectral mask for indoor channels shown in FIG. 1. The spectral mask shows power limits as a function of frequency.

In addition to this requirement, it is also required by IEEE 802.15 that UWB systems do not interfere with existing wireless systems, such as 802.15.1 (Bluetooth), 802.15.3 (personal area networks), 802.15.4 (Zigbee) and 802.11a and 802.11b (wireless local area networks).

Furthermore, UWB systems should also be resilient against interference from these existing wireless systems. In addition, UWB systems should also resist interference from home appliances, such as microwave ovens, and other narrowband interferers.

All these requirements impose additional constraints on the spectrum shaping. Minimizing interference, in both receivers and transmitters, requires placing minima on the poser in the transmission spectrum. Rigorously speaking, the spectral mask demands very low power in certain frequency bands, as well as matching filters. A null in the transmit spectrum also implies a null in the transfer function of the matching filter, and thus interference suppression at this frequency.

While some interference, e.g., microwave radiation, is at fixed frequencies, other interference is at variable frequencies, e.g., the different bands of 802.11a, or at frequencies that cannot be predicted a priori. Thus, it is necessary to be able to shape the spectrum adaptively.

For impulse radio signals, pulse-position modulation, (PPM) and pulse amplitude modulation (PAM) are the most popular signaling techniques. These techniques are combined with time hopping (TH) for multiple-access format. In TH, each symbol is represented by a series of "basis pulses." The location or delay of the pulses is determined by a time-hopping code. The time-hopping code is generated as a pseudo-random sequence.

In general, the spectrum with random code generation can be quite different from the FCC mask. As a result, in order to be compliant with FCC regulation, with a scaling of transmission power, the maximum allowed transmission power can be significantly restricted. Therefore, any signal shaping method that uses a basic, single short pulse must explicitly take the FCC mask into consideration.

Under certain conditions the spectrum of the transmit signal becomes identical to the spectrum of the basis pulse. Therefore, there is a need to modify the spectrum of the basis pulse to fit the requirements of both the FCC mask and industry standards.

SUMMARY OF THE INVENTION

The invention shapes the spectrum of a transmitted signal in an ultra wide bandwidth (UWB) system so that the transmitted signal meets regulatory constraints, as well as practical requirements of interference suppression.

The system according to the invention uses a linear combination of weighted, time-shifted (delayed) basis pulses in order to achieve a desired spectrum. Characteristically, the system uses a bank of basic pulses, preferably with different time-frequency duration, to approximate a given mask of general shape with a small number of parameters.

The weights and delays are selected according to criteria related to spectral efficiency, adherence to the FCC spectral mask, and other restrictions like maximum number of rake fingers.

The method for determining the weights is based on a non-linear search, initialized by the solution of a quadratic optimization problem. Two ways of approximating the original problem with a quadratic formulation are described. Additionally, the invention provides combinatorial optimization to perform discrete optimization over pulse positions (delays), as well as off-line selection from a basic pulse set.

DETAILED DESCRIPTION OF THE PREFERRED EMBODIMENT

Figure 1:
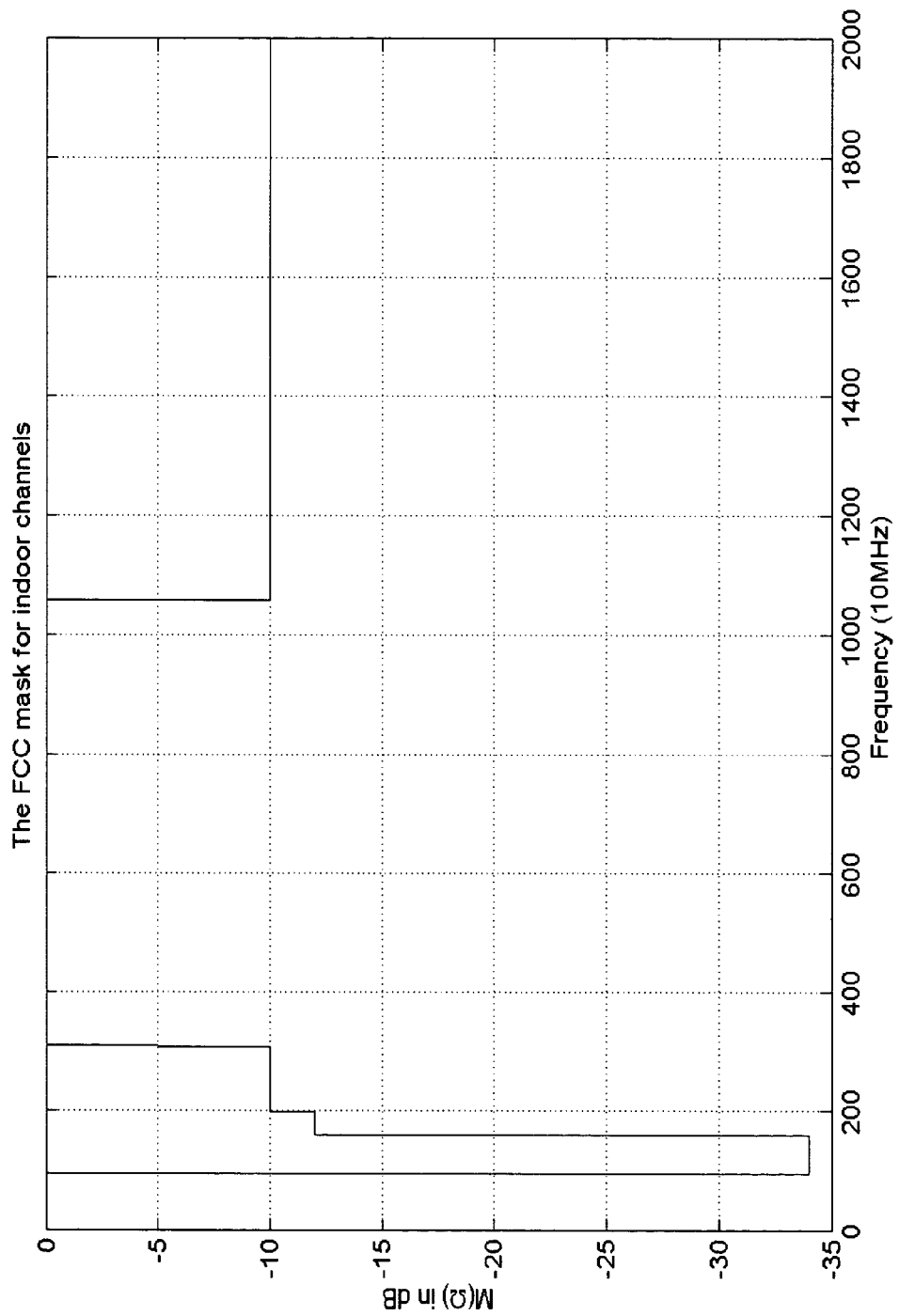
FIG. 1 is a graph of a spectral mask used by the invention.
Figure 2:
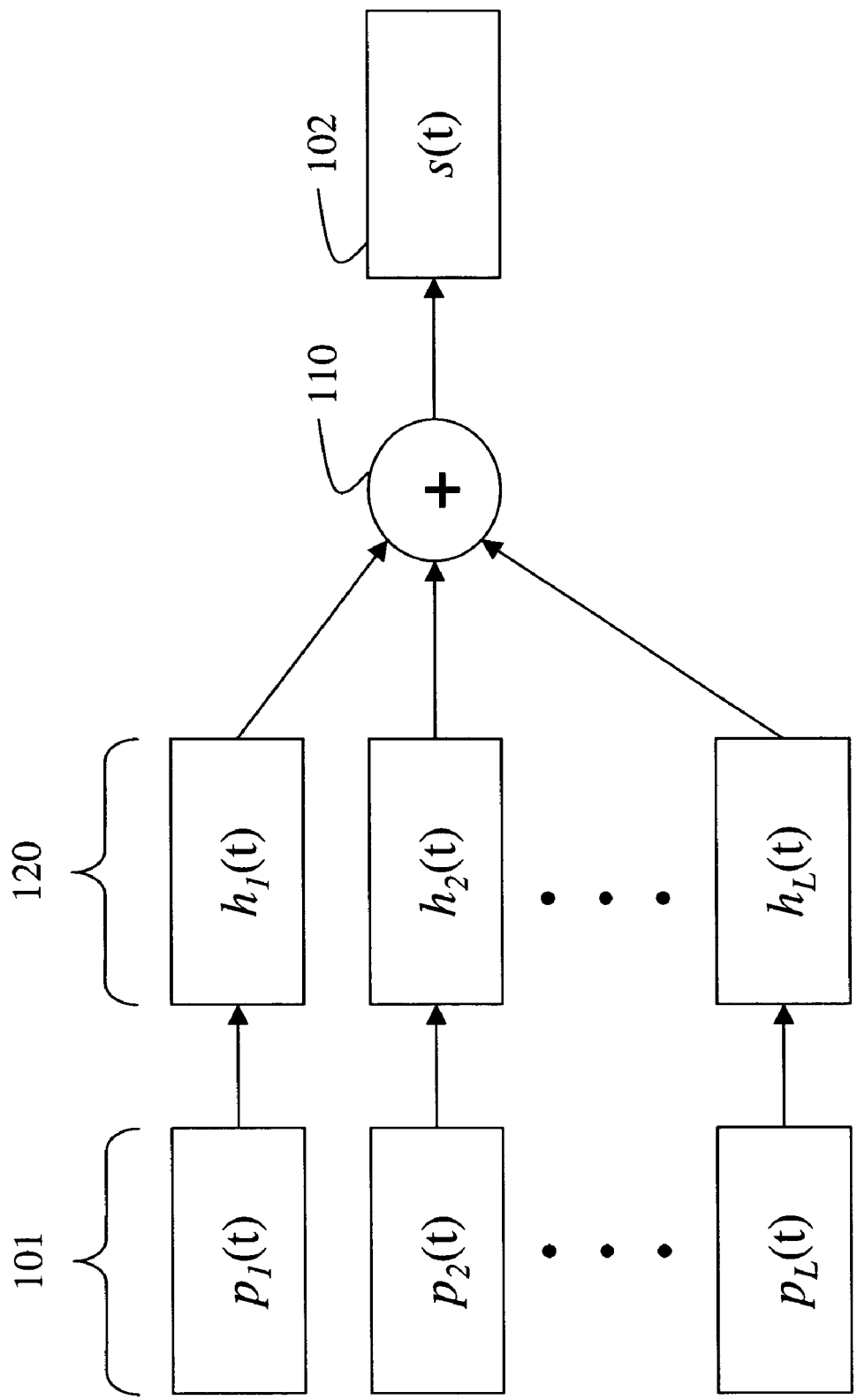
FIG. 2 is a block diagram of a system for shaping an ultra wide bandwidth spectrum according to the invention.

As shown in FIG. 2, our invention uses a linear combination 110 of a set of basis pulses 101 for shaping of a spectrum a transmitted impulse radio signal, s(t) 102, for example, a transmitted ultra wide bandwidth (UWB) signal. The basis pulses 101 are generated using circuits so that they are spread over the frequency spectrum with pseudo random delays.

Prior to the combining 110, a set of optimized filter and delay lines 120, $h_l(t)$, l=1, ..., L, is applied to the pulses to weight and delay the generated basis pulses to conform to a predetermine spectral mask.

The combination of the filtered pulses can be achieved by a combination of analogue delay lines, adders, and programmable pulse generators.

Figure 3:
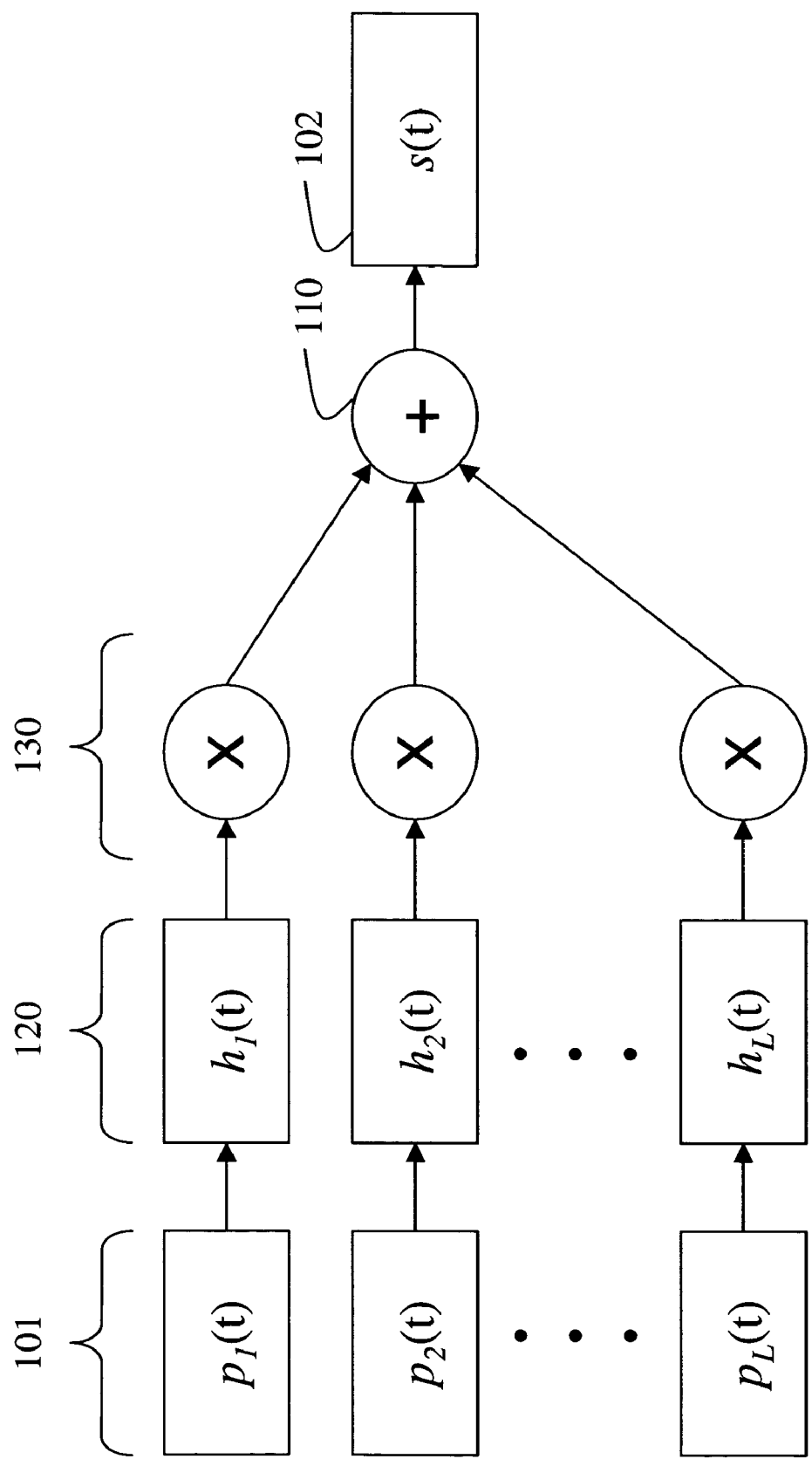
FIG. 3 is a block diagram of the system of FIG. 1 further including a set of oscillators according to the invention.

As shown in FIG. 3, our invention can also apply a set of oscillators 310 to the output of the filters 120 to shift the frequency, if necessary. The oscillators are of the form $\cos(\Omega_l t + \Phi_l)$. Frequency shifting enables an additional degree of freedom in the design, other than the delaying and weighting as shown in FIG. 2.

An important part of our method is the determination of the pulse weights and delays. We determine the weight and delays on either fixed or time-varying criteria for the spectrum shape of the resulting signal 102. These criteria can stem from the FCC spectral mask (fixed), from the necessity to avoid interference to other users, which can be pre-defined or time-varying, or following an instantaneous or averaged determination of the emissions of users in the current environment, or other criteria. In any case, these criteria are mapped onto an "instantaneous" spectral mask that has to be satisfied by the resulting signal 102.

Selecting Pulses Off-Line

The selection of the basis pulses 101 can be based on two criteria: implementation complexity, and approximation capability.

We prefer the basis pulses to be Gaussian in form. Gaussian pulses are relatively easy to generate, and their differentiations and integrations can be implemented with differentiation and integral circuits well known in the art.

The approximation can be performed with multi-resolution time-frequency analysis of signals using, for example, wavelets, and multi-resolution time-frequency approximation.

The signal of interest for the invention conforms to a desired spectral mask. Whereas a signal may be analyzed with respect an infinite number of possible bases in signal space, the choice of bases matters critically when one is restricted to a given number of bases available to approximate the spectrum of the desired signal.

A high-level description of the problem is given as follows. Assume there is a set of candidate of basis functions C. For example, the basis functions correspond to differentiations of a Gaussian pulse of various orders. In addition, the basis functions can be orthogonalized, e.g., by a sequential Gram-Schmidt procedure, to facilitate the subsequent optimization.

A set of typical masks available for training purpose is denoted by $S=\{M(\Omega)\}$, and one particular set of chosen bases as denoted by $\underline{p}(t)$. The particular set is obtained by stacking the selected basis functions into a column vector.

We define a function $f(\underline{p}(t), S)$ to evaluate the fulfillment of the two considerations. For example, the function is a weighted combination of two parts: the first part models a cost of generating the pulse, and the second part models an approximation error or some other efficiency metric. This function can be expressed as the formulation:

$$f(\underline{p}(t), S) = \alpha f_1(\underline{p}(t)) + \beta \sum_{M(\Omega) \in S} f_2(\underline{p}(t), M(\Omega)),$$

where $\alpha$ and $\beta$ are predetermined constants. This formulation is a combinatorial optimization problem, described below.

In comparison, the problem of optimal pulse locations is mainly for on-line applications, where the choices of bases are fewer, the implementation cost is fixed, and there is only one target mask, instead of a set of training pulses.

Formulation of the Problem

The individual basic pulses are denoted by $p_l(t)$, $l=1, \ldots L$, and their Fourier transforms by $P_l(j\Omega)$, $l=1, \ldots L$. The set of shaping filter 120 is FIR, with the impulse response being the sum of $\delta$-functions placed at different delays, $\tau$, and weighted or scaled, s, differently. Corresponding to FIG. 2, we have $$h_l(t) = \sum_{i=0}^{M_l} s_{li} \delta(t - \tau_{li}),$$

$$s(t) = \sum_{l=1}^{L} \sum_{i=0}^{M_l} s_{li} p_l(t - \tau_{li}),$$

$$S(j\Omega) = \int_{-\infty}^{\infty} s(t) e^{-j\Omega t} dt = \sum_{l=1}^{L} \sum_{i=0}^{M_l} s_{li} P_l(j\Omega) e^{-j\Omega \tau_{li}}.$$

We use the following notations:

$$R \equiv \int_{-\infty}^{\infty} \underline{p}(t) \underline{p}(t)^T dt,$$

$$\langle s(t), s(t) \rangle \equiv \int_{-\infty}^{\infty} s(t)^2 dt = \underline{s}^T R \underline{s}.$$

The elements of $\underline{p}(t)$ constitute a pool of bases pulses in the signal space. Then, the single user spectrum shaping problem can now be formulated as follows:

$$\max_{\underline{s}} \langle s(t), s(t) \rangle, \text{ subject to} |S(j\Omega)|^2 < M(\Omega), \forall \Omega \in [-\infty, +\infty],$$

subject to $|S(j\Omega)|^2 < M(\Omega)$, $\forall \Omega \in [-\infty, +\infty]$, where $M(\Omega)$ is an upper-bound on the squared magnitude response regulated by FCC.

This is equivalent to a min-max formulation:

$$\min_{\underline{s}} \max_{\Omega \in [-\infty, +\infty]} \frac{|S(j\Omega)|^2}{M(\Omega)},$$

subject to $\underline{s}^T R \underline{s} = 1$.

In addition, structural constraints can be put on the parameter vector $\underline{s}$ due to implementation concerns. For example, the number of non-zero elements in certain sub-vectors of the parameter vector $\underline{s}$ can be constrained.

In certain scenarios, the inner product of the desired signal $<s(t), s(t)>$ can be replaced by the maximum of the signal energy within a certain frequency range, e.g., the "in-band" proportions of energy are maximized. This only changes the definition of the matrix R.

In certain scenarios, the constraints $|S(j\Omega)|^2 < M(\Omega)$, $\forall \Omega \in [-\infty, +\infty]$ are extended to include integral spectrum constraints, e.g., for "out-of-band" signals, which produces interference to other devices. These constraints are not as strict as the fixed envelop definition of the FCC mask.

The modifications corresponding to the system shown in FIG. 3 follow after noting:

$$\int_{-\infty}^{+\infty} e^{-j\Omega t} \cos(\Omega_l t + \varphi_l) p_l(t - \tau_{li}) dt =$$

$$\frac{1}{2} P_l(j(\Omega - \Omega_l)) e^{-j(\Omega - \Omega_l)\tau_{li}} e^{j\varphi_l} + \frac{1}{2} P_l(j(\Omega + \Omega_l)) e^{-j(\Omega + \Omega_l)\tau_{li}} e^{-j\varphi_l}$$

Initializing Pulse Parameters

The min-max formulation as described above, or a robust $\infty$-norm minimization is known to be a difficult problem.

Several existing game-theoretic techniques rely on the existence of saddle points, which unfortunately are not satisfied in this case.

Therefore, we minimize with an approximate 2-norm formulation instead. In other words, we replace the maximum over all frequency by the minimum of a weighted integral formulation, i.e., $$\min_{\underline{s}} \int_{-\infty}^{+\infty} w(\Omega) \frac{|S(j\Omega)|^2}{M(\Omega)} d\Omega, \text{ subject to } \underline{s}^T R \underline{s} = 1.$$

We also note that:

$$\int_{-\infty}^{+\infty} w(\Omega) \frac{|S(j\Omega)|^2}{M(\Omega)} d\Omega = \int_{-\infty}^{+\infty} w(\Omega) \frac{\underline{s}^T P(j\Omega) P(j\Omega)^H \underline{s}}{M(\Omega)} d\Omega$$

$$= \underline{s}^T \left( \int_{-\infty}^{+\infty} w(\Omega) \frac{P(j\Omega) P(j\Omega)^H}{M(\Omega)} d\Omega \right) \underline{s}$$

$$= \underline{s}^T W \underline{s}.$$

Provided that there is no structural constraint on $\underline{s}$, the quadratic approximation leads to:

$$\min_{\underline{s}} \underline{s}^T W \underline{s},$$

subject to $\underline{s}^T R \underline{s} = 1$, for which the solution is an eigenvector corresponding to the smallest eigenvalue $\lambda$ of the matrix $w - \lambda R$. When there are structural constraints on $\underline{s}$ and the non-zero positions have been fixed, e.g., as one elementary step in a combinatorial optimization procedure, the problem bears a similar form except that W and R are now replaced by their corresponding principal sub-matrices.

Optimization Over Pulse Positions

One notable difference of our invention, compared with traditional least-squares FIR filter design, is that the pulse positions, i.e., delays of the non-zero elements in $\underline{s}$ are also optimized.

In prior art UWB systems, the random pulse-positive modulation relies essentially on a sparse arrangement of the pulses to support asynchronous transmissions, to provide better multi-path resolution, and to avoid catastrophic collisions.

The optimization over the pulse positions or delays is a combinatorial optimization problem, which determines an optimal subset selected from a given set of basis functions $\underline{p}(t)$.

As stated above, this problem is in similar form as the optimal choice of the initial basis functions, i.e., $p_1(t-\tau_{l_i})$, from a larger set of candidate pulses. The second cost function $f_2(\underline{p}(t), M(\Omega))$ can be selected as an extreme value of the min-max, or the approximate min-integral formulation.

Here, we describe three selection procedures, with the first two being greedy.

Iterative Greedy Addition

We initialize with an empty set of basis functions.

We search for a basis function from the candidate pool, which maximizes the cost function when added to the existing set of basis functions.

We select this basis function, and we repeat the search until the desired number of basis functions has been selected.

Iterative Greedy Removal

We initialize with the entire set of basis functions.

We search for a basis function from the candidate pool, which maximizes the cost function when removed from the existing set of basis functions.

We select this basis function, and we repeat the search until the desired number of basis functions has been selected.

Branch-and-Bound

This approach assumes that $p_1(t-\tau_{l_i})$ have already been orthogonalized and normalized. Additionally, this approach uses a quadratic approximation rather than the min-max formulation. In this case, R=I, and the minimum generalized eigenvalue of matrix pair (W, R) reduces to the minimum eigenvalue of W, which is the cost function to be minimized.

Let K denote the maximum number of non-zero elements. Let N denote the number of candidate pulses. Denote one arrangement of the pulse positions (delays) by a vector with K 1's, e.g., (1, 0, 0, 1, ..., 0).

In the following, we construct an enumeration tree of all the allowed combinations, where each node n is associated with a positioning vector with each element from the set {0, 1, *} where * means the position may be a 1 or 0. The enumeration tree is defined as follows:

The root of the tree is (*,*, ..., *), referring to all possible selections.

The first layer of the tree enumerates all the vectors with one 0 and N−1 *'s by considering the placement of a 0.

The children of any node with less than N−K zeros enumerates all the possibilities of putting another 0. To avoid duplications, ( ..., 0,*, ..., *) is by convention associated with one possible father node ( ..., *,*, ..., *), where the first dotted part is the same as the current child vector.

At each visited node, the procedure maintains a lower bound and an upper bound of the cost function among all the descendant combinations. The procedure visits the enumeration tree with certain order, e.g., depth-first, or breadth-first. When visiting a certain node, the procedure updates the upper-bound and lower-bound of the cost function. If the lower-bound is greater than the minimum upper-bound among the visited nodes, the sub-tree, with its root being the current node, is pruned from further consideration. The bounds are determined by Cauchy's interlacing theorem of eigenvalues for symmetric matrices:

Cauchy's Interlacing Theorem:

Let $A_r$ denote a r×r submatrix of a n×n real symmetric matrix A. The eigenvalues $\lambda_1 \leq \lambda_2 \leq \ldots \leq \lambda_n$ of A, and the eigenvalues $\mu_1 \leq \mu_2 \leq \ldots \leq \mu_r$ of $A_r$ satisfy the following relations: $\lambda_i \leq \mu_i \leq \lambda_{i+n-r}$, i=1, ..., r.

The procedure can terminate after visiting all the nodes. In this case, the procedure reaches a global optimal selection of pulse delays. Alternatively, the procedure can terminate when the cost function evaluated at a visited node is within $\epsilon$ of the current upper-bound of all the possible combinations.

Quadratic Optimization for L=1

For the special case of L=1 and $\tau_{l_i}$=i$\Delta\sigma$, i=1, ... $M_1$, a distinct quadratic approximation is pursued. In this formulation, the optimization over the pulse positions is directly solvable.

We introduce $$G(\Omega) = \frac{\sqrt{M(\Omega)}}{|P(j\Omega)|},$$

$$\phi(\Omega,\underline{s}) = |s_{l0} + s_{l1}e^{-j\Omega\Delta\tau} + \ldots + s_{lM_l}e^{-j\Omega M_l\Delta\tau}|^2.$$

Then, $$\max_{\Omega\in[-\infty,+\infty]} \frac{|S(j\Omega)|^2}{M(\Omega)} = \max_{\Omega\in[-\infty,+\infty]} \frac{\phi(\Omega,s)}{G(\Omega)^2}.$$

Note, $$\max_{\Omega\in[-\infty,+\infty]} \frac{\sqrt{\phi(\Omega,s)}}{G(\Omega)} - 1 = \max_{\Omega\in[-\infty,+\infty]} \frac{\sqrt{\phi(\Omega,s)} - G(\Omega)}{G(\Omega)}.$$

Now, we select a substantially large constraint, i.e., $\underline{s}^T R \underline{s} = b$, such that the above equation is equal to the $\infty$-norm. Although it does not make any difference in the original $\infty$-norm formulation, it does affect the 2-norm approximation. With the 2-norm approximation, the problem becomes a FIR filter design problem with a least-squares formulation:

$$\min_{\underline{s}} \int_\Omega \| s_{l0} + s_{l1}e^{-j\Omega\Delta\tau} + \ldots + s_{lM_l}e^{-j\Omega M_l\Delta\tau} | - G(\Omega)|^2 d\Omega,$$

subject to $\underline{s}^T R \underline{s} = b$ with $b \uparrow \infty$

This equation can be approximated by $$\min_{\underline{s},n} \sum_{i=0}^{M_1} (s_i - g_{i+n})^2,$$

subject to $\underline{s}^T R \underline{s} = b$ with $b \uparrow \infty$, where $g_n$ is a real sequence that produces an amplitude response $$G(e^{jw}) \equiv G\left(\frac{w}{\Delta\tau}\right).$$

In particular, we match the non-zero positions to the taps of $g_n$ with largest magnitudes. After, the positions of the taps have been fixed, the solutions to the tap weights are computed as $\underline{s} \propto \underline{u}_1 \underline{u}_1^T \underline{g}$, where $\underline{u}_n$ is the principal component of R, and $\underline{g}$ are the vectors constructed from elements of $g_n$ having largest magnitudes among those complying with the structural constraints of $\underline{s}$.

Note, the above two quadratic approximations are only two out of the many possible quadratic approximations. In essence, without FIR constraints and the degree of freedom constraints, the optimal solution is an IIR filter, which uniformly matches the FCC spectral mask.

The various quadratic approximations can be viewed as minimizing some distance measure between the pursued FIR solution and the IIR solution. We prefer the above quadratic approximation mainly because the joint optimizations over the weights and delays are easily solvable due to its special structure.

Non-linear Optimization with Neural Networks

Figure 4:
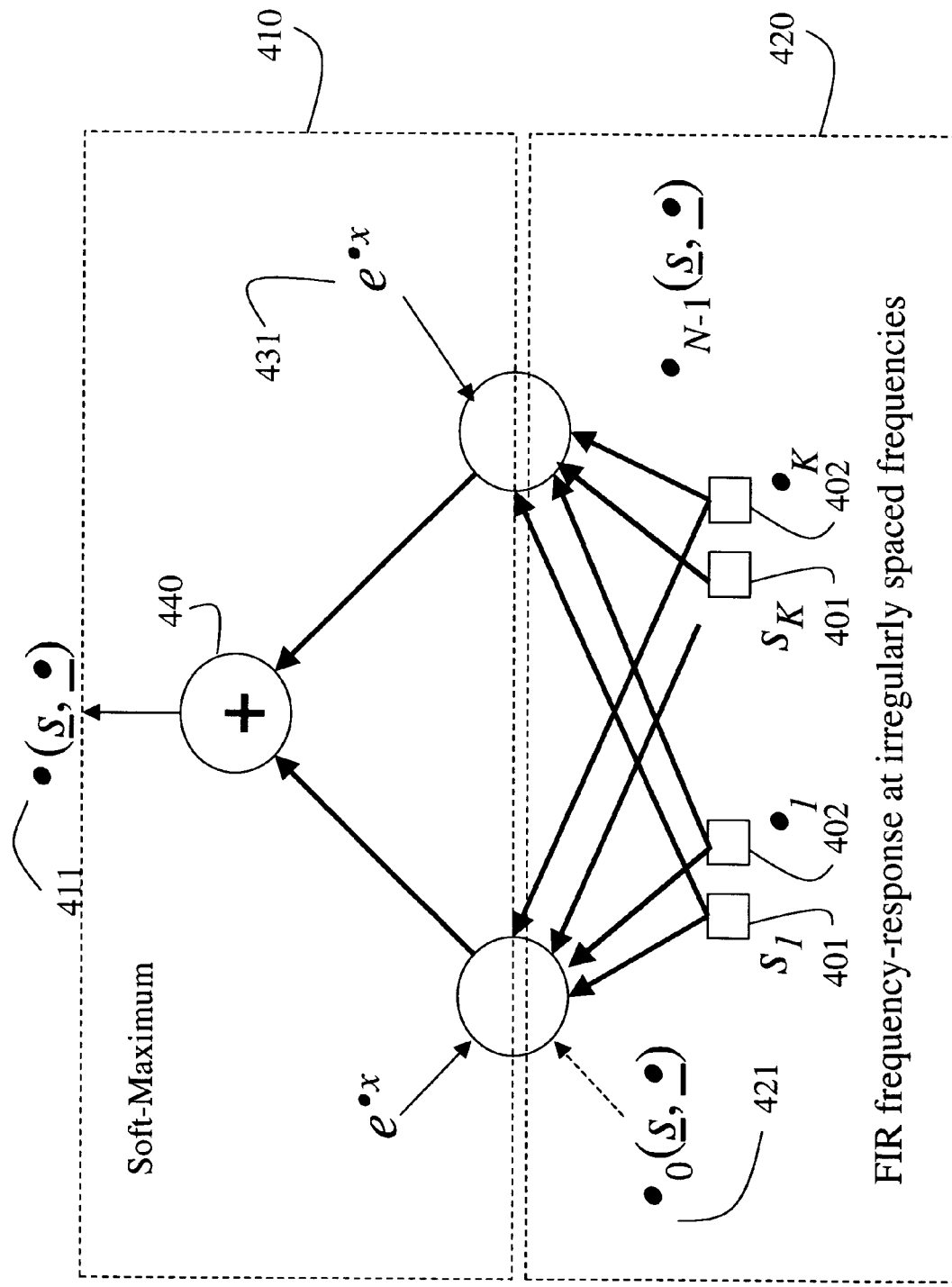
FIG. 4 is a block diagram of a feed-forward neural network used by the invention.

FIG. 4 shows a feed-forward network with a differential soft-maximum, 410, and FIR frequency-responses at irregularly spaced frequencies 420 to evaluate the function. In FIG. 4, the weighting or scaling coefficients are $\underline{s}$ 401, the pulse positions or delays are $\underline{\sigma}$ 402, $\Phi_i$ represents $|\phi_i(\Omega_i,\underline{s},\underline{\sigma})|^2$, $e^{\alpha x}$ 431 represents the exponential operator, and $\psi$ 411 represents the output of the soft maximization, i.e., the sum of the exponentials 431.

We initialize our solution with the above quadratic approximation, and further exploit non-linear optimization techniques to gradually refine the solutions. The description in this section refers to the original min-max formulation described above.

A back-propagated (BP) multi-layer perceptron (MLP) possesses adaptive learning abilities to estimate sampled functions, represent these samples, encode structural knowledge, and inference inputs to outputs via association. Its main strength lies in its substantially large number of hidden units, and thus, a large number of interconnections. The MLP neural networks enhance the ability to learn and generalize from training data.

We describe the MLP optimization for the special case L=1. Optimization of the scaling coefficients, with fixed positions in the general case L>1, follows similarly. Because L=1, all quantities that depends on L are simplified to shortened notations with the dependence removed.

In addition, we re-parameterize the problem so that $s_1 \ldots, s_k$ represent the scaling or weighting coefficients at the pulse locations (delays) $\sigma_1, \ldots \sigma_K$. Therefore, we define $\underline{\sigma} \equiv [\sigma_1, \ldots \sigma_K]^T$. The optimization over pulse positions for L=1 can be treated by MLP, for L>1. We refer again to the three combinatorial optimization approaches discussed earlier.

In order to put the current problem into the general framework of MLP, we uniformly quantize the frequency range to arrive at $$\max_{\Omega\in[-\infty,+\infty]} \frac{|S(j\Omega)|^2}{M(\Omega)} \approx \max_{i\in\{0,1,\ldots N-1\}} \frac{|S(j\Omega_i)|^2}{M(\Omega_i)}.$$

rthrh

Then, we replace the max-function with a differentiable soft-max. Given a function $f(x) > 0$, $x \in S$, for a sufficiently large positive number $\alpha$, we have the following soft-max approximation:

$$\max_{x \in S} f(x) \approx \frac{1}{\alpha} \ln \sum_{x \in S} e^{\alpha f(x)}.$$

Then, we replace the max-function with a differentiable soft-max. Given a function $f(x) > 0$, $x \in S$, for a sufficiently large positive number $\alpha$, we have the following soft-max approximation:

$$\max_{x \in S} f(x) \approx \frac{1}{\alpha} \ln \sum_{x \in S} e^{\alpha f(x)}.$$

With these two simplifications, the problem becomes $$\min_{\underline{s},\underline{\tau}} \psi(\underline{s}, \underline{\tau}),$$

subject to $\underline{s}^T R(\underline{\sigma}) \underline{s} = 1$, with $R(\underline{\sigma})$ being the principal submatrix of R corresponding to delays $\underline{\sigma}$ and $$\psi(\underline{s}, \underline{\tau}) \equiv \sum_{i=0}^{N-1} e^{\alpha \phi_i(\underline{s},\underline{\tau}) G(\Omega_i)},$$

$\phi_i(\underline{s},\underline{\tau}) = \phi(\Omega_i, \underline{s}, \underline{\tau})$.

Figure 5:
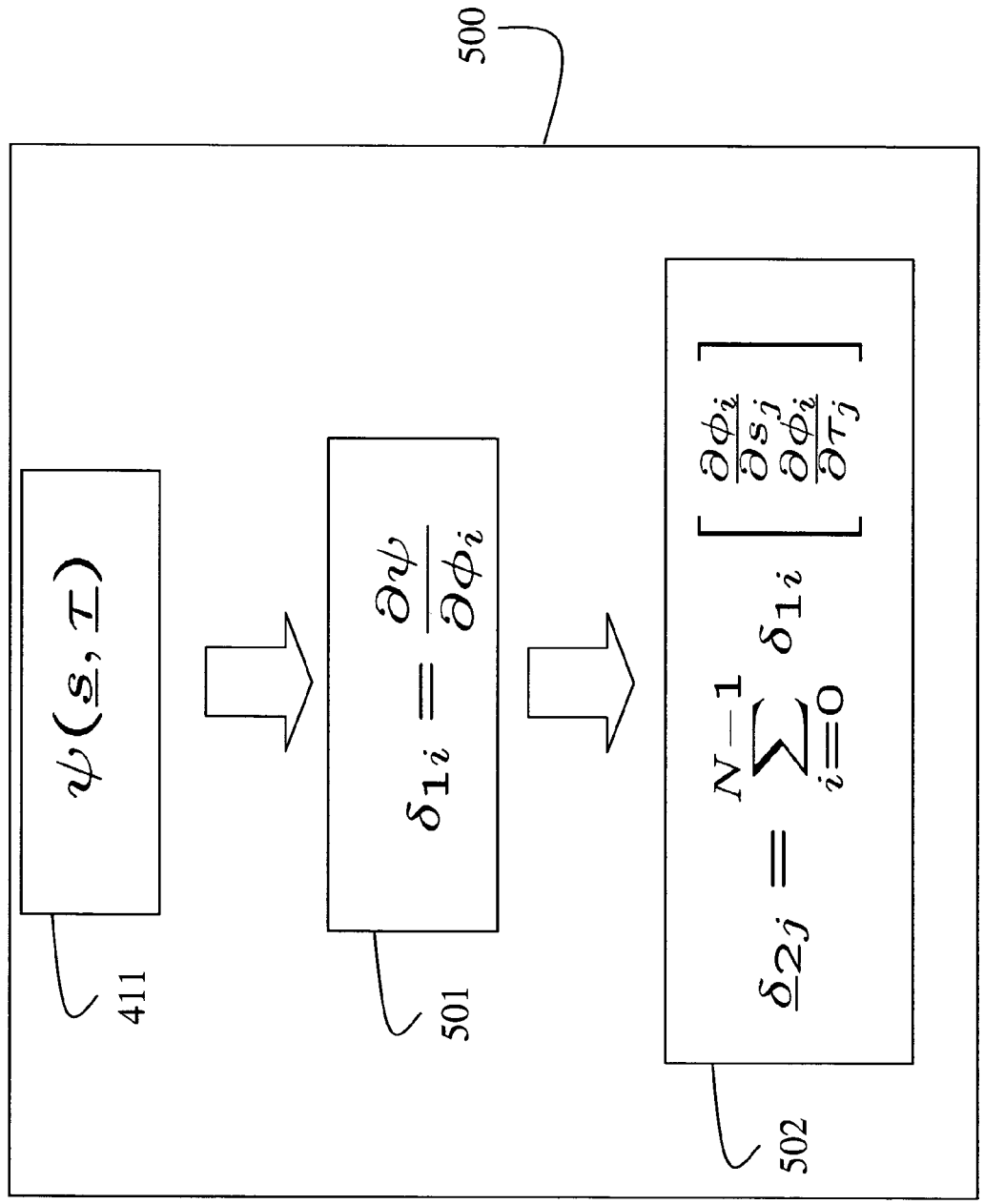
FIG. 5 is a block diagram of feed-backward neural network for adaptive optimization with back-propagation according to the invention.

FIG. 5 shows the feed-backward network 500 for adaptive optimization with back-propagation, where 501 and 502 are the derivatives defined by the equations in FIG. 5.

While it is theoretically possible to simultaneously adjust both the positions or delays $\underline{\tau}$ 401 and the weighting or scaling coefficients $\underline{s}$ 402, practically we prefer to decouple their tuning by adopting a conditional maximization approach, i.e., optimizing one with the other fixed. In addition, this decoupling may be justified by the different nature of the two parameter sets. In preferred embodiment, with the allowed positions quantized, the slight change $\underline{\sigma} \to \underline{\sigma} + \mu \delta_{2\tau}$ is always normalized to "hop" to the nearest valid quantization point on the multi-dimensional grid.

Typically, numerical non-linear optimizations can only be assured to arrive at a local optima rather than a global one. Simulated annealing can be used to avoid local optima. One approach to escape from possible local minima is to begin the optimization with several randomly distributed initial solutions, and select the best solution among the different trial paths.

We note that this is only one possible neural network, which again is just one of the methods for implementing non-linear optimization.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for shaping a spectrum of an impulse radio signal, comprising:
    generating a set of ultrawide bandwidth basis pulses at a plurality of frequencies and a plurality of random delays;
    optimizing, jointly, weights and delays as a solution to a quadratic optimization problem to approximately minimize a deviation of the spectrum from a spectral mask an ultrawide bandwidth spectral mask, in which the spectral mask is designed for indoor channels and limits power as a function of frequency in the spectral mask;
    orthogonalizing and normalizing the set of ultrawide bandwidth basis pulses; and
    applying a branch and bound procedure to the set of orthogonalized and normalized ultrawide bandwidth basis pulses to optimize the delays;
    weighting the set of ultrawide bandwidth basis pulses by the weights;
    delaying the set of basis pulses by the random delays; and
    combining linearly the weighted and delayed basis pulses to conform the spectrum to the ultrawide bandwidth spectral mask, and wherein the weights and delays are fixed over time for the spectral mask, and wherein the ultrawide bandwidth basis pulses are selected from a set of basis pulses by a combinatorial optimization using training spectral masks.

2. A method of claim 1 further comprising:
    shifting frequencies of the weighted and randomly delayed ultrawide bandwidth basis pulses before the combining.

3. The method of claim 1 wherein the weights and delays vary over time to adaptively shape the spectrum.

4. The method of claim 1 wherein the ultrawide bandwidth basis pulses are Gaussian in form.

5. The method of claim 1 wherein the weighting and delaying are performed by a set of filters and a set of delay lines, and the combining is performed by an adder.

6. The method of claim 1 further comprising:
    evaluating a cost function to determine the weights and delays.

7. The method of claim 6 wherein the cost function, $f$, includes first and second functions $f_1$ and $f_2$, and $$f(\underline{p}(t), S) = \alpha f_1(\underline{p}(t)) + \beta \sum_{M(\Omega) \in S} f_2(\underline{p}(t), M(\Omega)),$$

where $\alpha$ and $\beta$ are predetermined constants, $S = ^{M(\Omega)}$ denote the spectral mask, and $\underline{p}(t)$ denotes the set of basis pulses, and the first function $f_1$ models a cost of generating the basis pulses, and the second function $f_2$ models an approximation error.

8. The method of claim 1 wherein the delays are fixed, and further comprising:
    solving a quadratic optimization problem to approximately minimize a deviation from the spectral mask.

9. The method of claim 8 further comprising:
    refining the weights and delays by a non-linear optimization.

10. The method of claim 9 wherein the non-linear optimization is performed by a back-propagation neural network.

11. The method of claim 9 wherein the non-linear optimization is performed by a multiple-layer neural network.

12. The method of claim 9 wherein the non-linear optimization is performed by a simulated annealing process.

13. The method of claim 1 further comprising:
    selecting the set of basis pulses from a candidate set of basic pulses by greedy addition to optimize the delays.

14. The method of claim 1 further comprising:
    selecting the set of basis pulses from a candidate set of basic pulses by greedy removal to optimize the delays.

15. The method of claim 1 further comprising:
orthogonalizing and normalizing the set of basis pulses; and
applying a branch and bound procedure to the set of orthogonalized and normalized basis pulses to optimize the delays.

16. The method of claim 1 wherein bounds of the branch and bound procedure are determined by Cauchy's interlacing theorem of eigenvalues for symmetry matrices.

17. The method of claim 1 wherein the branch and bound procedure further comprises:
constructing an enumeration tree with an increasing number of zeros in vectors representing the delays.

18. A system for shaping a spectrum of an impulse radio signal, comprising:
means for generating a set of ultrawide bandwidth basis pulses at a plurality of frequencies and a plurality of random delays
means for optimizing, jointly, weights and delays as a solution to a quadratic optimization problem to approximately minimize a deviation of the spectrum from an ultrawide bandwidth spectral mask, in which the spectral mask is designed for indoor channels and limits power a function of frequency in the spectral mask;
a set of delay lines configured to delay the set of basis pulses by the random delays; and
an adder configured to combine linearly the weighted and delayed basis pulses to conform the spectrum to the ultrawide bandwidth spectral mask, and wherein the ultrawide bandwidth basis pulses are selected from a set of basis pulses by a combinatorial optimization using training spectral masks.

19. The system of claim 18 further comprising:
a set of oscillators configured to shift frequencies of the weighted and delayed basis pulses before the combining.

* * * * *